United States Patent [19]

Rouse

[11] Patent Number: 4,498,552
[45] Date of Patent: Feb. 12, 1985

[54] LAWN MOWER FRICTION DRIVE MECHANISM

[75] Inventor: Russell V. Rouse, Conyers, Ga.

[73] Assignee: Snapper Power Equipment, Division of Fuqua Industries, Inc., McDonough, Ga.

[21] Appl. No.: 480,905

[22] Filed: Mar. 31, 1983

[51] Int. Cl.³ .................. F16H 15/08; B62D 51/04
[52] U.S. Cl. ............................ 180/70.1; 74/194; 192/52
[58] Field of Search ........... 192/52; 180/221, 70 R; 464/30; 74/194, 214

[56] References Cited

U.S. PATENT DOCUMENTS

| | | | |
|---|---|---|---|
| 1,953,187 | 4/1934 | Nakashian | 192/52 |
| 3,327,546 | 6/1967 | Gordon et al. | 74/194 |
| 3,445,991 | 5/1969 | Hanson et al. | 74/194 |
| 3,613,814 | 10/1971 | Prien | 74/194 |
| 3,631,730 | 1/1972 | Hadler | 74/194 |
| 3,667,304 | 6/1972 | Puffer et al. | 74/197 |
| 3,706,363 | 12/1972 | Niles | 74/194 |
| 3,971,463 | 7/1976 | Zindler | 192/52 |

Primary Examiner—Richard A. Bertsch
Attorney, Agent, or Firm—William E. Mouzavires

[57] ABSTRACT

A friction drive mechanism is provided for machinery such as a lawn mower wherein a driven wheel is provided with an outer ring that slips upon initial engagement with a driving disc. The coefficient of friction between the inner surface of the ring and the driven wheel is selected such that when slippage occurs, it occurs at this interface and not between the outer surface of the ring and the driving disc. Upon initial start-up when the driven ring first engages the driving disc, the ring will slip relative to the driven wheel to avoid a sudden transmission of torque to the ground wheels. The coefficient of friction and the normal force between the inner surface of the ring and the driven wheel are selected such that gradually the relative velocity between the ring and driven wheel decreases to zero and the ring no longer slips on the driven wheel but rotates at the same speed as the driven wheel.

21 Claims, 7 Drawing Figures

LAWN MOWER FRICTION DRIVE MECHANISM

BACKGROUND OF INVENTION

The present invention relates to friction drive mechanisms particularly suitable for use in power driven vehicles such as riding lawn mowers. It is typical for such drive mechanisms to utilize a driving disc operated by the output of an engine to drive a driven wheel or roller which is connected to the axle of the ground-engaging wheels by means of a transmission so as to power-drive the vehicle over the ground surface. The driven wheel has fixed on its periphery, a friction ring typically made from rubber material for engaging the surface of the driving disc with sufficient friction to propel the vehicle.

Several factors combine to produce high acceleration during the initial forward motion of the riding mower. Among these factors are: the engine power is dictated by the grasscutting function of the machine and this power is much greater than needed for propulsion alone; the transmission ratio from the engine to the wheels is relatively high because the ground speeds of the machine must be low, and this speed reduction is accompanied by a corresponding multiplication of torque available to the wheels; the machine is equipped with a hand throttle that is fixed to a preselected speed by the operator and is not variable during start-up as with an automobile; the throttle is generally set at full or near full engine speed to best accomplish the grass cutting function; and, the relative high friction between the driving disc and the driven wheel necessary for proper function and durability.

The result of high starting acceleration is jerky operation which can cause operator discomfort and annoyance, as well as vehicle instability in circumstances of improper use by the operator. Moreover, this jerky operation contributes to accelerated wear and early failure of transmission components.

Attempts have been made in the past to overcome the aforementioned conditions. For example, U.S. Pat. No. 3,667,304 to Puffer et al discloses a friction drive for a riding lawn mower which utilizes two springs exerting different biasing forces for urging the driven wheel against the driving disc. One spring initially engages the driven wheel with the disc with a first spring force and the other spring is operable to increase the biasing force between the roller and the disc after initial engagement of the roller with the disc under the influence of the first spring. Preferably, the second spring has a spring rate greater than the spring rate of the first spring. This spring system is rather complicated and it is difficult to control the biasing force against the driven wheel.

Another attempt to provide a smooth starting drive mechanism for a lawn mower is disclosed in U.S. Pat. No. 3,706,363 to Niles. It discloses a plurality of clutches between the driving disc and the driven wheel for initially providing slippage in the clutches. However, this system decreases the useful service life because of the increase in the number of parts and the number of wearing surfaces on the clutch members and the driven wheel. Moreover, the clutch discs require, for their engagement, axial forces parallel to their mounting shaft which tend to cause binding after sufficient usage. Also, the system of Niles patent may not be applicable to existing lawn mower mechanisms without substantial modification.

OBJECTS OF THE PRESENT INVENTION

It is an object of the present invention to provide a novel friction drive mechanism for use, such as in a riding lawn mower, which will provide smooth starts by gradually increasing vehicle velocity and limiting the rate of acceleration during the initial engagement of the drive mechanism thereby increasing comfort and control as well as reducing shock loads to the drive train.

Another object of the present invention is to provide such a friction drive mechanism which, upon initial movement, will slip and transmit less torque to ensure smooth starts and will gradually establish a positive and effective friction drive.

A further object of the present invention is to provide such a friction drive mechanism which will accomplish the above results, while being reasonably durable and comprised of a minimum number of parts, primarily one replacement part, and which may be applied to some existing drive mechanisms and transmission systems without fundamental changes.

A further object of the present invention is to provide such a friction drive mechanism which will accomplish the above and will perform in a manner that does not produce sudden increases in starting acceleration because of any reasonably foreseeable changes to the mechanism caused by component failure, wear, repair or adjustment.

SUMMARY OF INVENTION

The friction drive mechanism of the present invention in summary includes the provision of a friction ring mounted about the periphery of the driven wheel for movement relative thereto upon initial engagement with the driving disc. The coefficient of friction between the inner surface of the ring and the driven wheel is selected such that when slippage occurs, it occurs at this interface and not between the outer surface of the ring and the driving disc. Upon initial start-up when the friction ring first engages the driving disc, the ring will slip relative to the driven wheel to avoid a sudden start of the ground wheels. Gradually, the frictional force between the inner surface of the ring and periphery of the driven wheel causes the relative velocity between the two to decrease to zero and establish a direct drive.

DRAWINGS

Other objects and advantages of the present invention will appear from the following detailed description taken in conjunction with the attached drawings in which.

DETAILED DESCRIPTION

Figure 1:
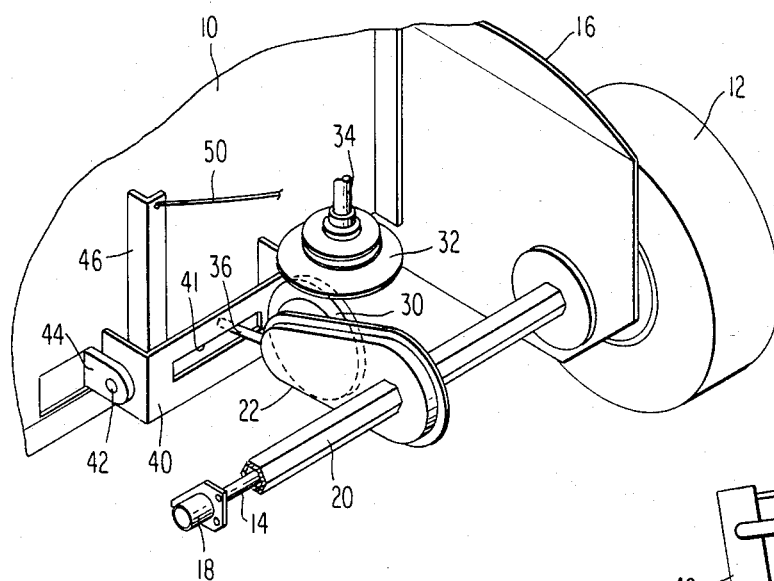
FIG. 1 is a perspective view of a rear end portion of a lawn mower embodying the friction drive mechanism of the present invention.

Referring now to the drawings in detail, there is shown for illustrative purposes only a friction drive mechanism incorporated in the rear of a lawn mower which may be a riding lawn mower shown in FIG. 1 as including a main frame portion 10 with rear wheels 12 (only one shown) mounted in a forwardly extending portion 16 of frame 10 through means of an axle 14. Wheels 12 are mounted on axle 14 by any conventional means such as the wheel mount 18 shown on one of the ends of the axle. The axle 14 is rotated through means of an elongated hexagonal metallic tube 20 which may be termed a "hex tube" which is received about axis 14 and coextensive therewith; there being a transmission (not shown) between hex tube 20 and axle 14 for transmitting driving force from the hex tube to the axle. The gearing inside the transmission is such that axle 14 rotates in opposite direction to hex tube 20.

Figure 2A:
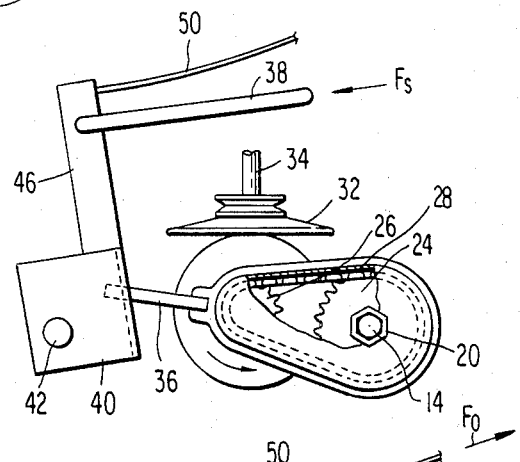
FIG. 2a is a side elevational view of the friction drive mechanism and associated parts when engaged.

Referring to FIG. 2a together with FIG. 1, hex tube 20 is driven through means of a chain case generally designated 22, including a large sprocket 24 received about hex tube 20 to drive the same; it being understood that sprocket 24 has a hexagonal center aperture aligned with the hexagonal configuration of hex tube 20 so as to drive the same upon rotation of sprocket 24. Chain case 22 further includes a small sprocket 26 driven in rotation by means of a driven wheel generally designated 30 and which is operatively connected to the small sprocket 26 to drive the same in rotation upon rotation of driven wheel 30 as will be described in greater detail. Rotation of small sprocket 26 is transmitted to large sprocket 24 by means of a chain 28.

Figure 3:
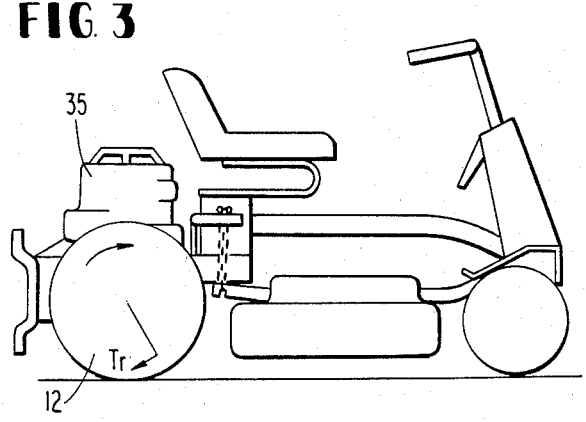
FIG. 3 is a side elevational view of a riding lawn mower embodying the invention and illustrating certain forces developed in association with the rear ground wheels.

Driven wheel 30 is driven by a driving disc 32 which is mounted to a vertical shaft 34 for rotation about the axis of shaft 34 which leads from the output of an associated motor or engine, such as 35 illustrated in FIG. 3. As is well-known, the frictional engagement between the periphery of driven wheel 30 and the underlying surface of driving disc 32 establishes the drive between the two elements. The speed of rotation is dependent, of course, upon the position of the driving wheel 30 relative to the axis of rotation of driving disc 32. The greater the distance, the greater the speed and, of course, when driven wheel 30 is at the center of driving disc 32, the speed will be zero and the drive will be in neutral. The direction of the drive, of course, is dependent on whether the driven wheel is on one side of the axis of drive shaft 34 or on the other side thereof.

In order to change the speed or direction of the drive, driven wheel 30 is made movable across the disc surface of driving disc 32. This may be effected in any suitable manner, such as by a linkage mechanism including a link (not shown) which may be connected to chain case 22 so as to be able to move chain case 22 and the associated driven wheel 30 laterally in a horizontal plane relative to driving disc 32.

In order to normally bias the driving wheel 30 into engagement with the surface of the driving disc to establish a frictional driving engagement, a spring (not shown) is provided in any conventional manner to normally exert a spring force Fs on a clutch rod 38. Referring to FIG. 2a, the latter is fixed to a yoke generally designated 40 which is mounted for pivotal movement about a pivot pin 42 which mounts yoke 40 to a bracket 44 that is fixed to frame 10 as shown in FIG. 1. A similar bracket and pivot pin is utilized to mount the other side of yoke 40 relative to main frame portion 10. The yoke includes an upstanding arm 46, and the spring rod 38 is fixed to the arm 46.

Figure 2B:
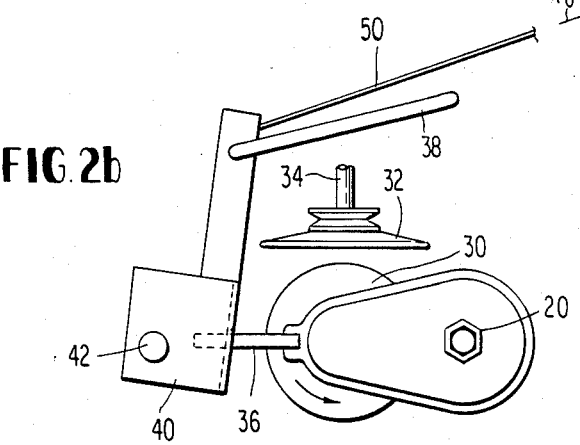
FIG. 2b is a view similar to FIG. 2a showing the drive mechanism disengaged.

When the clutch pedal is free, clutch rod 38 will urge yoke 40 in a counterclockwise direction as viewed in FIG. 2a so as to maintain driven wheel 30 in engagement with driving disc 32. In order to disengage driven wheel 30 from driving disc 32, it is necessary to depress the clutch pedal (not shown), which in turn will tension a clutch cable 50 as shown in FIG. 2b wherein the force along the clutch cable 50 is indicated as Fo. This force will cause yoke 40 to pivot clockwise about pivot 42, thus lowering driven wheel 30 out of engagement with driving disc 32 as shown in FIG. 2b. When the clutch pedal is released, the drive will be automatically reengaged by virtue of the spring force Fs acting on clutch rod 38 causing yoke 40 to move in a counterclockwise direction about pivot 42 until the driven wheel 30 is engaged against driving disc 32.

The structure and operation described thus far, may be considered as conventional or resident in the prior art. Moreover, with conventional friction drives, a rubber ring is often employed about the periphery of driving wheel 30 to enhance frictional engagement with driving disc 32. However, due to the aggressive nature and high friction coefficient of rubber, excessive power for propulsion, high fixed engine speeds, and a high torque multiplication from the engine to the wheels, a situation may develop where undesirably high starting acceleration may occur.

In order to overcome this condition, the present invention utilizes a certain type of a slip clutch in the drive mechanism. This is effected by forming the driven wheel 30 with a ring freely mounted on its periphery so as to be capable of rotation relative thereto along the peripheral surface of wheel 30 during start-up. In addition, the coefficient of friction between the inner surface of the ring and the driven wheel is selected such that when slippage occurs, it occurs at this interface and not between the outer surface of the ring and the driving disc.

Figure 5:
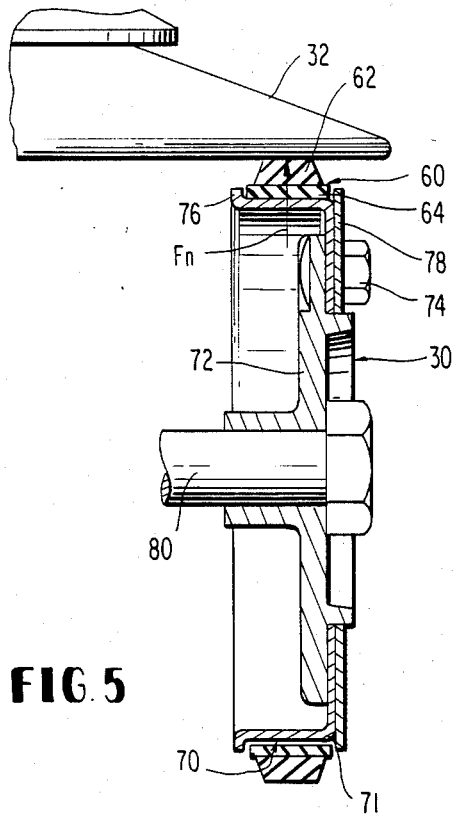
FIG. 5 is an enlarged, cross-sectional view taken diametrically through a driven wheel included in the drive mechanism.
Figure 6:
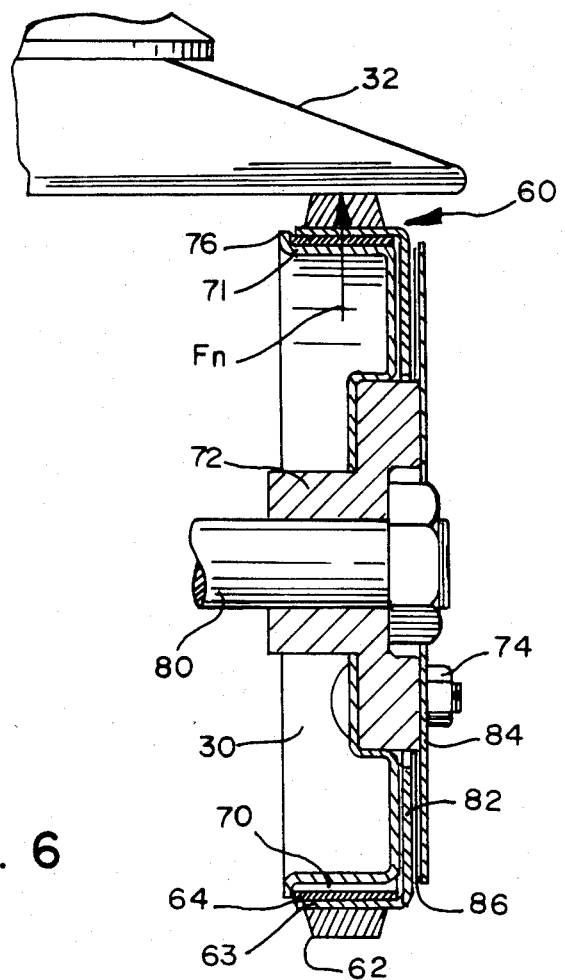
FIG. 6 is a view generally similar to FIG. 5 but showing a preferred embodiment of the invention.

In the embodiment shown in FIG. 5, the ring is generally designated 60 and includes an outer ring 62 made from a material such as rubber and an inner ring 64 fixed to outer ring 62 such as by bonding. Inner ring 64 is received about the cylindrical peripheral surface 70 of driven wheel 30 so as to be rotatable relative thereto as will be further described. The coefficient of friction between the inner surface of ring 64 and the peripheral surface 70 of driven wheel 30 is in the range of approximately 0.2 to 0.4. Possible combinations for these two surfaces might be brass and steel and/or asbestos or similar friction material and steel. In one embodiment such as shown in FIG. 5, peripheral surface 70 of wheel 30 may be formed as part of a cup-shaped element 71 fixed to a wheel hub 72 by means of bolts and nuts generally designated 74. Inner ring 64 is maintained on surface 70 against axial movement by means of an annular flange 76 which may be formed integral with peripheral surface 70, and a plate 78 which is fixed by means of the nut and bolt assemblies 74 to the base of the cup-shaped element 71 on the side opposite flange 76. Hub 72 is mounted on a shaft 80 which is operatively connected to drive the small sprocket 26 of the chain case 22 as described above. Referring to FIG. 6, a preferred embodiment is shown wherein the outer ring 62 and inner ring 64 are fixed to opposite surfaces of a metallic ring 63 which is a flange portion of a circular web plate 82; the latter being mounted for rotation about hub 72 and held in proper axial position by a circular cover plate 84 held by bolts 74 (one shown) in the proper axial position. Additionally, a flat ring 86 of any suitable low friction material is preferably interposed between web plate 82 and cover plate 84.

Figure 4:
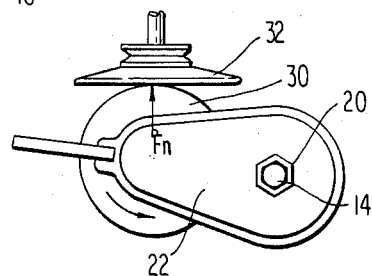
FIG. 4 is a view similar to FIG. 2a with parts removed and illustrating certain forces developed in the drive mechanism.

During start up, when the drive mechanism moves from the disengaged position shown in FIG. 2b to the engaged position shown in FIG. 2a, the normal force Fn (see FIGS. 4, 5 and 6) goes from zero when the clutch is disengaged to a maximum after the clutch is engaged. When the driven ring 60 first comes into contact with the driving disc 32, the normal force Fn is small. Because the coefficient of friction between the rubber outside ring 62 of driven ring 60 and the drive disc 32 is greater than that between the inside ring 64 and the peripheral surface 70 of the driven wheel 30, the driven ring 60 will instantly accelerate to match the velocity of the drive disc 32 and will slip on the peripheral surface 70 of the driven wheel 30. Although the ring 60 will slip, it will still engage the peripheral surface 70 of the driven wheel 30 to cause a driving torque Tr to be transmitted to the axle and rear tires. As the normal force Fn increases the relative velocity between ring 60 and driven wheel 30 decreases and the amount of driving torque to the rear tires increases. The result of this action is to create a transitory period wherein the torque Tr to rear tires is allowed to gradually increase. Once the relative velocity between the wheel 30 and the driven ring 60 is zero, no slippage occurs and a direct drive is established. Because the static coefficient of friction is greater than the dynamic coefficient of friction, a larger torque is required to cause the clutch to slip out of a direct drive condition than was required to start the wheels turning.

It will be seen from the above, that the present invention not only provides for more comfortable and controlled start-up of a riding mower by providing a transition period of gradual or smooth acceleration to bring the friction drive up to the maximum direct drive speed, but also the present invention significantly reduces shock loads throughout the drive train during start-up. Another advantage is that it increases the life of the driven ring. Not only does the present invention provide the above advantages, but furthermore, it includes a minimum of parts and may be applied to new or existing friction drives, including conventional drives in a manner that precludes sudden increases in acceleration by foreseeable changes in the mechanism.

Moreover, the concept of the driven ring 60 with its dual torque transferring capabilities on the inner and outer surfaces thereof may also be applied in forming other driven clutch members such as in transmission systems. In this regard, a pulley may be formed to include a ring mounted on the periphery of a hub for movement relative to the hub and with the inner surface of the pulley formed from a material having a coefficient of friction chosen so that the frictional forces between the ring and the hub would be less than the forces generated between the outer surface of the ring and the associated drive belt. In this manner, when the drive belt was tensioned, there would initially be slip between the ring and the hub so as to smooth out or gradually increase the acceleration of the hub. This could be particularly useful in a clutched belt system wherein the load must be smoothly accelerated and/or sudden increases in torque must not be demanded of the driving means.

What is claimed is:

1. A friction drive mechanism comprising in combination, a rotatable driving member having a driving surface, a rotatable driven member to be driven by the driving member and extending in a plane generally at right angles to the driven surface, said driven member having a peripheral surface and a ring concentrically mounted on the peripheral surface for movement relative thereto, said ring having an outer peripheral surface tangentially engageable with said driving surface and said ring having an inner surface engageable with the peripheral surface of the driven member, and wherein the coefficient of friction between the driving surface and said outer surface of the ring and the coefficient of friction between the inner surface of the ring and peripheral surface of the driven member is such that upon initial engagement with the driving surface, the ring will be rotatable relative to the driven member.

2. The drive mechanism defined in claim 1 wherein the coefficient of friction between said inner surface of the ring and said peripheral surface of the driven member is great enough to transfer torque to start up and continue to drive in a direct drive manner but small enough so as not to cause aggressive initial engagement.

3. The drive mechanism defined in claim 2 wherein said coefficient of friction is approximately 0.2 to 0.4.

4. The drive mechanism defined in claim 3 wherein the outer surface of said ring is formed from rubber or rubber-like material.

5. The drive mechanism defined in claim 4 wherein said ring is formed from inner and outer concentric pieces fixed together and wherein the outer piece is formed from rubber-like material.

6. The drive mechanism defined in claim 4 wherein said inner surface of the ring is formed from an asbestos or similar friction material.

7. In a vehicle having drivable ground-engaging wheels, power means providing a source of energy for driving said ground-engaging wheels, and means for transmitting the drive from the power means to the ground-engaging wheels including a torque tube operatively connected to the ground-engaging wheels to drive the same, a transmission operatively connected to the torque tube to drive the same, a friction drive mechanism operatively connected at one end to the power means and at the other end to the transmission and wherein the friction drive mechanism includes a driving disc and a driven wheel to be driven by the driving disc, and wherein there is included spring means normally urging the driven wheel into engagement with the driving disc; the improvement comprising a ring mounted concentrically on the periphery of the driven wheel for movement relative thereto, the ring having an outer surface engageable with the driving disc and an inner surface engageable with the periphery of the driven wheel, and wherein the coefficient of friction between the driving disc and the outer surface of the ring and the coefficient of friction between the inner surface of the ring and the periphery of the wheel is such that upon initial engagement with the driving disc, the ring will be rotatable relative to the driven wheel.

8. The improvement defined in claim 7 wherein the coefficient of friction between the inner surface of the ring and the periphery of the wheel is great enough to transfer enough torque to start up and continue to drive in a direct drive manner but small enough so as not to cause aggressive initial engagement.

9. The improvement as defined in claim 8 wherein said coefficient of friction between the inner surface of the ring and the periphery of the wheel is approximately 0.2 to 0.4.

10. The improvement as defined in claim 9 wherein the outer surface of the ring is formed by rubber-like material.

11. The improvement as defined in claim 10 wherein the inner surface of the ring is formed from an asbestos or similar friction material.

12. A drive wheel for use as a clutch or speed transmission member comprising a hub having an axis of rotation, a ring mounted on the periphery of the hub for rotation relative to the hub about the axis of rotation of the hub, said ring having an outer surface to be tangentially engageable with a driving member and an inner surface engageable with the peripheral surface of the hub, the coefficient of friction between the driving member and the outer surface of the ring and the coefficient of friction between the inner surface of the ring and the peripheral surface of the hub is such that upon initial engagement with the driving member, the ring will rotate relative to the hub.

13. The drive wheel defined in claim 12 wherein said coefficient of friction between the inner surface of the ring and the peripheral surface of the hub is approximately 0.2 to 0.4.

14. The drive wheel defined in claim 13 wherein said inner surface is formed from an asbestos or similar friction material.

15. The drive wheel defined in claim 14 wherein said outer surface is formed of rubber or rubber-like material.

16. The drive wheel defined in claim 12 wherein said ring is formed to include two or more pieces fixed together as a unit with one piece including said outer surface and one piece including said inner surface.

17. In a vehicle having drivable ground-engaging wheels, power means providing a source of energy for driving said ground-engaging wheels, means for transmitting the drive from the power means to the ground-engaging wheels to drive the same including a friction drive mechanism operatively connected at one end to the power means and at the other end to the ground-engaging wheels and wherein the friction drive mechanism includes a driving member and a driven wheel to be driven by the driving member, the improvement comprising a ring mounted concentrically on the periphery of the driven wheel for movement relative thereto, the ring having an outer surface engageable with the driving member and an inner surface engageable with the periphery of the driven wheel, and wherein the coefficient of friction between the driving member and the outer surface of the ring and the coefficient of friction between the inner surface of the ring and the periphery of the driven wheel is such that upon initial engagement with the driving member, the ring will be rotatable relative to the driven wheel.

18. The improvement defined in claim 17 wherein the coefficient of friction between the inner surface of the ring and the periphery of the wheel is great enough to transfer enough torque to start up and continue to drive in a direct drive manner but small enough so as not to cause aggressive initial engagement.

19. The improvement as defined in claim 18 wherein said coefficient of friction between the inner surface of the ring and the periphery of the driven wheel is approximately 0.12 to 0.4.

20. The improvement as defined in claim 19 wherein the outer surface of the ring is formed by rubber-like material.

21. The improvement as defined in claim 20 wherein the inner surface of the ring is formed from an asbestos or similar friction material.

* * * * *